United States Patent
Salver et al.

(10) Patent No.: US 11,551,242 B2
(45) Date of Patent: Jan. 10, 2023

(54) SYSTEM AND METHOD FOR PROVIDING INTELLIGENT DASHBOARDS FOR CRITICAL BUSINESS FLOWS

(71) Applicant: JPMORGAN CHASE BANK, N.A., New York, NY (US)

(72) Inventors: Mahender Kashyap Salver, Hyderabad (IN); Venkat Nagabhushan Rao Melam, Hyderabad (IN); Bharath Madishetty, Hyderabad (IN); Venkataramani Krishnakumar, Hyderabad (IN); Gaurav Mahindra, Hyderabad (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 39 days.

(21) Appl. No.: 17/120,680

(22) Filed: Dec. 14, 2020

(65) Prior Publication Data

US 2021/0182879 A1    Jun. 17, 2021

Related U.S. Application Data

(60) Provisional application No. 62/947,709, filed on Dec. 13, 2019.

(51) Int. Cl.
*G06Q 10/06* (2012.01)
*G06Q 30/02* (2012.01)
(Continued)

(52) U.S. Cl.
CPC ....... *G06Q 30/0201* (2013.01); *G06F 16/252* (2019.01); *G06N 5/04* (2013.01);
(Continued)

(58) Field of Classification Search
None
See application file for complete search history.

(56) References Cited

U.S. PATENT DOCUMENTS 6,421,571 B1 * 7/2002 Spriggs ................ G05B 19/19
700/83
7,475,206 B2 * 1/2009 Murotani ............. G06F 3/0649
711/161

(Continued)

FOREIGN PATENT DOCUMENTS

WO    WO 0165322 A1 * 9/2001
WO    WO 2016112858 A1 * 7/2016

OTHER PUBLICATIONS

Yesudas et al, Intelligent operational dashboards for smarter commerce using big data, in IBM Journal of Research and Development, vol. 58, No. 5-6, Nov. 2014 https://ieeexplore.ieee.org/abstract/document/6964872 https://ur.booksc.eu/book/33703379/981f00 (Year: 2014).*

*Primary Examiner* — Octavian Rotaru
(74) *Attorney, Agent, or Firm* — Greenblum & Bernstein, P.L.C.

(57) ABSTRACT

An embodiment of the present invention is directed to monitoring the health of critical business flows in real time, helping faster detection and diagnosis of incidents improving stability. An embodiment of the present invention is directed to generating and providing interactive dashboards with historical trend analysis of identified parameters. An embodiment of the present invention is directed to monitoring the health of critical business flows in real time and enabling faster detection and diagnosis of incidents thereby improving stability and consistency.

16 Claims, 8 Drawing Sheets

(51) Int. Cl.
  *G06Q 10/10* (2012.01)
  *G06Q 30/00* (2012.01)
  *G06F 16/25* (2019.01)
  *G06N 5/04* (2006.01)
  *G06F 3/0481* (2022.01)

(52) U.S. Cl.
  CPC ..... *G06Q 10/0633* (2013.01); *G06Q 10/0639* (2013.01); *G06Q 10/10* (2013.01); *G06Q 30/016* (2013.01); *G06F 3/0481* (2013.01)

(56) References Cited

U.S. PATENT DOCUMENTS

| | | | | |
|---|---|---|---|---|
| 8,744,898 | B1* | 6/2014 | Hewett | G06Q 30/02 705/7.29 |
| 9,094,519 | B1* | 7/2015 | Shuman | H04L 65/1069 |
| 9,112,974 | B1* | 8/2015 | Wilsie | H04M 3/5175 |
| 9,247,014 | B1* | 1/2016 | Rao | G06F 16/9038 |
| 9,544,438 | B1* | 1/2017 | Andraszek | G06F 21/60 |
| 10,057,197 | B1* | 8/2018 | Ritchie | H04W 4/14 |
| 2001/0037399 | A1* | 11/2001 | Eylon | H04L 65/612 718/100 |
| 2011/0307354 | A1* | 12/2011 | Erman | G06F 8/60 705/26.7 |
| 2013/0103667 | A1* | 4/2013 | Minh | H04L 51/02 707/730 |
| 2013/0144603 | A1* | 6/2013 | Lord | H04L 67/306 704/235 |
| 2014/0100923 | A1* | 4/2014 | Strezo | G06Q 10/067 705/7.11 |
| 2014/0173460 | A1* | 6/2014 | Kim | G06F 3/04817 715/753 |
| 2014/0270139 | A1* | 9/2014 | Conway | H04M 3/42161 379/265.06 |
| 2014/0280068 | A1* | 9/2014 | Dhoopar | G06Q 30/016 707/722 |
| 2015/0036813 | A1* | 2/2015 | Ananthakrishnan | H04M 7/0027 379/265.09 |
| 2016/0099892 | A1* | 4/2016 | Palakovich | H04L 51/04 709/206 |
| 2016/0205697 | A1* | 7/2016 | Tan | H04W 24/02 370/329 |
| 2016/0360039 | A1* | 12/2016 | Sanghavi | H04L 51/046 |
| 2017/0031536 | A1* | 2/2017 | Shah | G06Q 50/01 |
| 2017/0124487 | A1* | 5/2017 | Szeto | G06F 11/1448 |
| 2017/0180276 | A1* | 6/2017 | Gershony | H04L 51/222 |
| 2017/0180294 | A1* | 6/2017 | Milligan | H04L 51/216 |
| 2018/0005246 | A1* | 1/2018 | Basam | H04L 41/0631 |
| 2018/0032941 | A1* | 2/2018 | Naous | G06Q 10/06393 |
| 2019/0102469 | A1* | 4/2019 | Makovsky | G06F 11/3072 |
| 2019/0102719 | A1* | 4/2019 | Singh | H04L 41/5032 |
| 2019/0227822 | A1* | 7/2019 | Azmoon | G06F 40/186 |
| 2019/0235744 | A1* | 8/2019 | Burpulis | G06F 40/143 |
| 2019/0251593 | A1* | 8/2019 | Allouche | G06Q 10/0639 |
| 2019/0266064 | A1* | 8/2019 | Srinivasan | H04L 41/5074 |
| 2019/0281465 | A1* | 9/2019 | Moshir | H04L 63/0428 |
| 2020/0007680 | A1* | 1/2020 | Wozniak | H04M 3/242 |

* cited by examiner

Figure 7

| Active P1s: 2 | Active Alerts: 9 | Active Changes: 2 |
|---|---|---|
| App Name (P1 Link) | App Name (5) | App Name (Change Link) |
| App Name (P1 Link) | App Name (4) | App Name (Change Link) |
| 710 | 712 | 714 |

Legend:
- ○ Flow has no active P1s or Alerts
- ● Flow has one or more active P1s or Alerts
- (!) Flow has one or more active changes
- ■ Flow has one or more applications with active P1s
- ▨ Flow has one or more applications with active Alerts
- □ Flow currently does not have either active P1s or active Alerts

| Becoming a Customer  720 | Active P1 | Active Alerts |
|---|---|---|
| *DDA-Acct-Open-Branch* | ● | ○ |
| *DDA-Acct-Open-Digital* | ○ | ● |
| *Credit Card Opening-Digital* | ● | ● |
| Credit Card Opening-Branch | ○ | ○ |

| Own a Home  722 | Active P1 | Active Alerts |
|---|---|---|
| DDA-Acct-Open-Branch | ○ | ○ |
| DDA-Acct-Open-Digital (!) | ○ | ○ |
| Credit Card Opening-Digital | ○ | ○ |
| Credit Card Opening-Branch | ○ | ○ |

| Protect my Money  724 | Active P1 | Active Alerts |
|---|---|---|
| DDA-Acct-Open-Branch | ○ | ○ |
| DDA-Acct-Open-Digital | ○ | ○ |
| Credit Card Opening-Digital | ○ | ○ |
| Credit Card Opening-Branch | ○ | ○ |

| Pay with My Bank  726 | Active P1 | Active Alerts |
|---|---|---|
| QuickPay-Digital | ○ | ○ |
| QuickPay-Mobile | ○ | ○ |
| Quick Deposit – Digital | ○ | ○ |
| Quick Deposit – Mobile (!) | ○ | ○ |
| Rewards and Benefits | ○ | ○ |
| BillPay – Digital | ○ | ○ |
| BillPay – Onus – Online | ○ | ○ |
| BillPay – Mobile | ○ | ○ |
| Funds Transfer – Digital | ○ | ○ |
| Funds Transfer – Mobile | ○ | ○ |
| Pay with Card – Digital | ○ | ○ |
| Pay with Card – Mobile | ○ | ○ |
| Pay with Card – POS | ○ | ○ |
| BillPay – Mobile | ○ | ○ |
| Cash Withdrawal – Branch | ○ | ○ |
| Quick Deposit | ○ | ○ |
| Protect my Money | ○ | ○ |

| Update My Account  728 | Active P1 | Active Alerts |
|---|---|---|
| DDA-Acct-Open-Branch | ○ | ○ |
| DDA-Acct-Open-Digital | ○ | ○ |
| Credit Card Opening-Digital | ○ | ○ |
| Credit Card Opening-Branch | ○ | ○ |

| Grow my Wealth  730 | Active P1 | Active Alerts |
|---|---|---|
| DDA-Acct-Open-Branch | ○ | ○ |
| DDA-Acct-Open-Digital | ○ | ○ |
| Credit Card Opening-Digital | ○ | ○ |
| Credit Card Opening-Branch | ○ | ○ |

Alert Types Reported
- Alert Type 1, Alert Type 2, Alert Type 3

Information Sources

732  Incident Data – ITSM
Change Data – HPSM
Alert Data – NetCool, Splunk

US 11,551,242 B2

SYSTEM AND METHOD FOR PROVIDING INTELLIGENT DASHBOARDS FOR CRITICAL BUSINESS FLOWS

CROSS REFERENCE TO RELATED APPLICATIONS

The application claims priority to U.S. Provisional Application 62/947,709, filed Dec. 13, 2019, the contents of which are incorporated herein in its entirety.

FIELD OF THE INVENTION

The invention relates generally to a system and method for providing intelligent interactive dashboards of critical business flows.

BACKGROUND OF THE INVENTION

Service providers and other entities are focused on recovering incidents (such as P1 incidents) in a short span of time. P1 (or Priority 1) incidents represent severe or major impact issues. Addressing P1 incidents may involve automatic monitoring of critical business flows to address customer impacts. Generally, a majority of time and resources is consumed by detection and diagnosis tasks that involve diversified teams. Current systems require manual intervention for issue identification. However, there is a lack of insights into critical business flows and tangible transactions across the flows.

These and other drawbacks exist.

SUMMARY OF THE INVENTION

According to an embodiment, the invention relates to a system that provides an interactive business flow interface. The system comprises: a database that stores flow definition data and flow data aggregation; a flow interactive interface that receives user input via a communication network; and a computer processor, coupled to the database and the interactive interface, programmed to perform the steps of: retrieving, via a flow view interface, flow view request data relating to at least one application and at least one asset; responsive to the flow view request data, performing flow data analysis and flow data aggregation; retrieving, by a flow metadata service, application data relating to the at least one application; retrieving, by an application asset data collection service, asset data relating to the at least one asset from one or more information sources; collecting application specific monitoring data from one or more information sources; and generating a flow interface that identifies a plurality of flows where each flow represents a customer interaction and the flow interface further identifies an active incident, active alerts and active changes for one or more problematic flows based on severity for issue identification.

According to another embodiment, the invention relates to a method that provides an interactive business flow interface. The method comprises: retrieving, via a flow view interface, flow view request data relating to at least one application and at least one asset; responsive to the flow view request data, performing flow data analysis and flow data aggregation; retrieving, by a flow metadata service, application data relating to the at least one application; retrieving, by an application asset data collection service, asset data relating to the at least one asset from one or more information sources; collecting application specific monitoring data from one or more information sources; and generating a flow interface that identifies a plurality of flows where each flow represents a customer interaction and the flow interface further identifies an active incident, active alerts and active changes for one or more problematic flows based on severity for issue identification.

The system may include a specially programmed computer system comprising one or more computer processors, interactive interfaces, electronic storage devices, and networks. The computer implemented system and method described herein provide unique advantages to entities, organizations and other users, according to various embodiments of the invention. Current systems are application-specific so that a comprehensive understanding of a product flow is not attainable through each application separately. With most businesses, product/business flows or customer journeys generally involve multiple separate applications. Accordingly, an embodiment of the present invention provides high level views of critical workflows that span multiple applications with classifiable parameters such as Incident, Change, Monitoring and Performance Metrics. Through an embodiment of the present invention, users are able to quickly and readily identify issues. This leads to improved resolution and prompt responses.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 7 is an exemplary illustration of a business flow dashboard, according to an embodiment of the present invention.

DETAILED DESCRIPTION OF THE PREFERRED EMBODIMENT(S)

Figure 1:
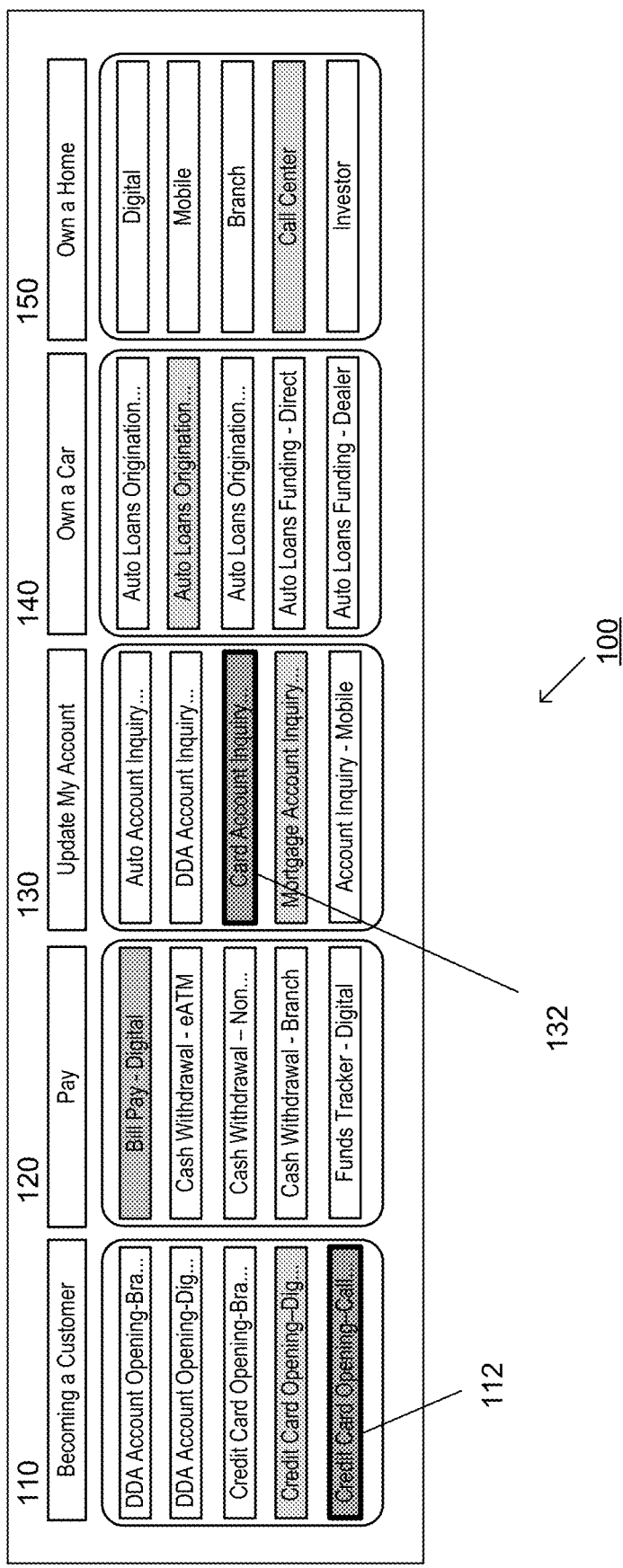
FIG. 1 is an exemplary illustration of a business flow dashboard, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to providing observability with Intelligent Dashboards of critical business flows and corresponding tangible transactions across the flows. This may involve generating and providing interactive dashboards with historical trend analysis of identified parameters. In addition, the innovative system and method are directed to monitoring the health of critical business flows in real-time and enabling faster detection and diagnosis of incidents thereby improving stability and consistency.

An embodiment of the present invention provides smart visualization of customer journeys and critical business flows with classifiable parameters, such as Incident, Change, Monitoring and Performance Metrics. Based on specific industries and business objectives, other parameters and variations may be applied. An embodiment of the present invention may be consumed across an entity to review the key performance indicators (KPIs) across various critical business flows. The highly scalable and self-sustainable smart visualizations may be leveraged for various additions and/or modifications to the flows.

Critical business flows may be consolidated and categorized based on a business or lines of business. Classifiable metrics and/or parameters may be identified with a robust sustainable model. Metrics may include operations, monitoring, performance, etc. Data integration models may be defined from the classifiable parameters.

An embodiment of the present invention is directed to analyzing applications as related to customer journeys and critical business flows, as opposed to viewing applications from a single line of business (LoB) view. An embodiment of the present invention recognizes that customer interactions oftentimes touch upon multiple applications as well as multiple lines of business. For example, an interaction may involve a customer transferring funds to a friend or family member. This seemingly single transaction or flow may actually involve multiple applications across multiple lines of business through various connections.

Through an interactive interface, an embodiment of the present invention may provide details concerning multiple customer or business flows. Each flow may represent a customer interaction or journey that involves one or more applications that may span across multiple lines of business. Flows may also be referred to as Production Product Flows that represent customer interactions with an entity through various channels.

An embodiment of the present invention is directed to facilitating detection as well as diagnosis of incidents of varying severity and complexity. For example, an interactive interface may graphically identify a flow that is not performing or operating properly. In this example, the flow may be highlighted (e.g., red or amber) based on a severity of a particular issue. With an embodiment of the present invention, a user may immediately determine which applications have issues and further drilldown on the underlying details. This may be particularly helpful for an operator of a command center, server management, product management, mission control, etc. For example, the operator may view an issue in red (or other graphic) and then interact with the highlighted flow. The operator may view or access various layers associated with the highlighted flow. In this scenario, the operator may view all the applications associated with that flow and further identify any issues with one or more of the applications.

In addition, an embodiment of the present invention may identify applications as well as connections between applications. If an embodiment of the present invention identifies an issue with a connection, the connections may also be highlighted. By interacting with the highlighted connection, an embodiment of the present invention may provide details that drilldown to the layer with the issue or problem. The layer may include a connection layer between two applications, operating system of a database, middleware application layer, etc. Accordingly, an embodiment of the present invention may precisely identify an issue in production to facilitate detection and diagnosis.

An embodiment of the present invention may include additional functionality, such as analytics, prediction and self-healing features. For a particular flow, an embodiment of the present invention may provide statistical analysis, e.g., average Mean Time to Repair (MTTR), number of tickets, metrics, etc. Prediction analytics may include analysis relating to historical data, identifying patterns and then predicting one or more potential instances. Prediction analytics may be applied to identify and potentially address an issue before a customer is impacted. Analytics may further include prediction metrics that represent the number of issues that were properly predicted based on historical data. Metrics may also include self-healing metrics, including how many incidents were self-healed.

FIG. 1 is an exemplary illustration of a business flow dashboard, according to an embodiment of the present invention. FIG. 1 illustrates a plurality of business flows as shown on a dashboard or interactive interface, represented by 100. As shown in FIG. 1, exemplary business flow categories may include Becoming a Customer 110, Pay 120, Update My Account 130, Own a Car 140 and Own a Home 150. Flows with potential issues or problems may be identified by color, notification, indicia and/or other icon or visual. As shown in FIGS. 1, 112 and 132 are highlighted for immediate attention. Severity or urgency of issues may be identified by varying graphics and/or notifications. For example, business flows in red (or other graphic) may denote a high level of risk or a severe issue, amber may indicate a medium level of risk while green may represent no issue. Other variations may be applied. FIG. 1 is an example of business flows relevant to a financial entity. This is merely illustrative and the embodiments of the present invention are not limited to a specific application or industry. The various embodiments of the present invention may be applied to other industries, applications, businesses, use cases, scenarios, etc.

Figure 2:
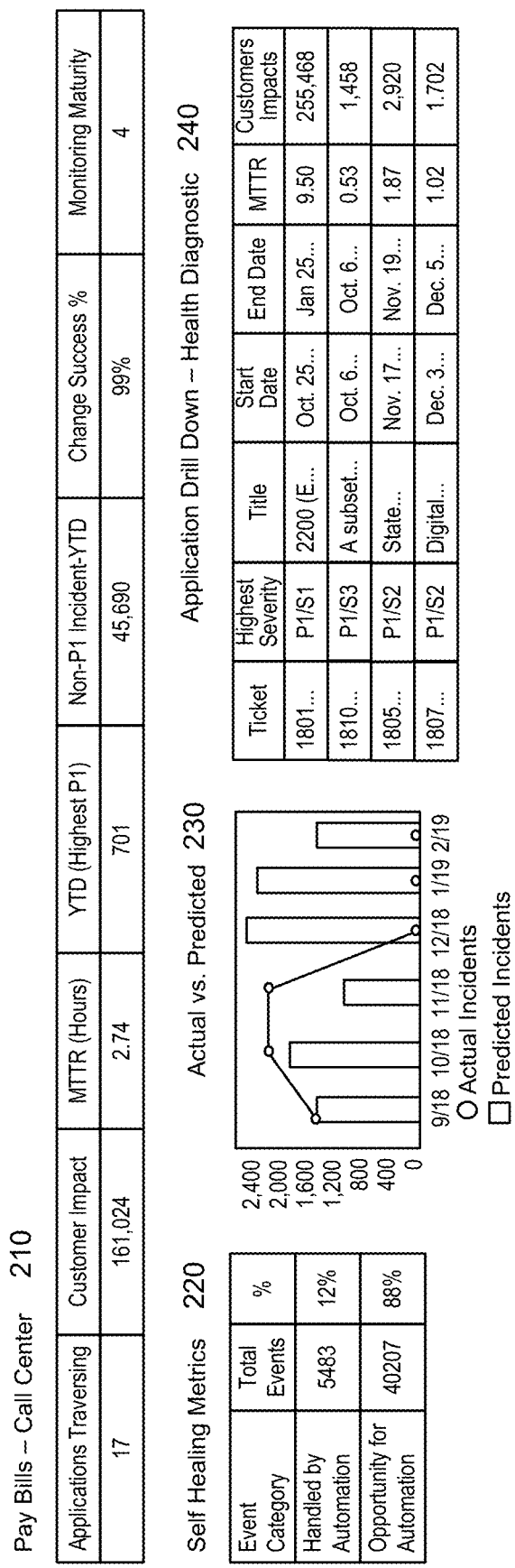
FIG. 2 is an exemplary illustration of an interface for an exemplary business flow, according to an embodiment of the present invention.

FIG. 2 is an exemplary illustration of an interface for an exemplary business flow, according to an embodiment of the present invention. FIG. 2 illustrates a detailed business flow, e.g., Pay Bills—Call Center. As shown in FIG. 2, metrics may be displayed at 210. Exemplary metrics may include Application Traversing; Customer Impact; Mean Time to Repair (MTTR) (e.g., in hours or other time period); YTD (Highest P1); Non-P1 Incident YTD, Change Success percentage, and Monitoring Maturity. Other metrics, details and information may be provided. FIG. 2 may also include Self-Healing Metrics shown at 220, which may include event category, total events and percentage. As shown at 220, an embodiment of the present invention may address identified issues through automation or self-healing functionality. Graphic 220 further identifies opportunities for additional automation. Graphic 230 may provide actual versus predicted metrics to illustrate insights and trends. Application details may be provided at 240 which represents Health Diagnostic data, including Ticket (or other identifier), Highest Severity, Title, Start Date, End Date, MTTR and Customer Impacts.

Figure 3:
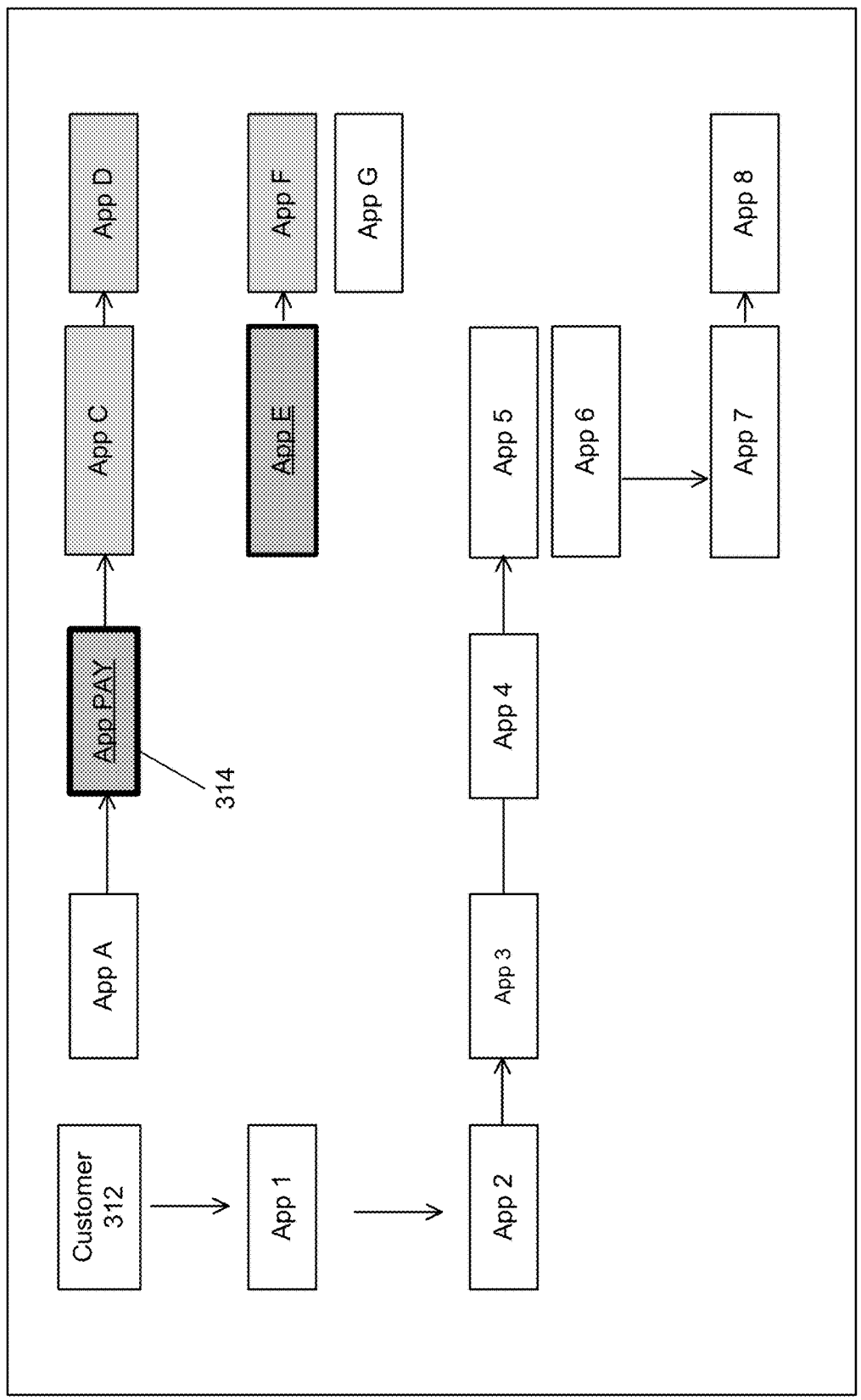
FIG. 3 is an exemplary illustration of a detailed view of an exemplary business flow, according to an embodiment of the present invention.

FIG. 3 is an exemplary illustration of a detailed view of an exemplary business flow, according to an embodiment of the present invention. FIG. 3 illustrates a set of exemplary applications for a particular business flow. FIG. 3 provides detailed flow information and identifies where a particular issue resides. A user may quickly identify issues as indicated by an interactive user icon, e.g., color, notification, graphic, etc.

According to a particular scheme, an application may be highlighted in red as representing active PIs. Another application may be highlighted in amber to represent active alerts. Other applications may be highlighted in green, as representing no active P1s or Alerts. A symbol, such as an exclamation point, may identify an application with active change. Other indicia and schemes may be applied. In addition, connections may be generated and further highlighted for issue identification.

For example, App PAY application (shown by 314) may be highlighted as having certain issues. In this example, the highlighting may indicate that for this application current data for memory usage has reached a maximum threshold. Other thresholds and warning levels may be applied. By selecting App PAY in FIG. 3, additional details concerning various layers of information (e.g., infrastructure layer, application layer, etc.) may be provided.

As shown in FIG. 3, each block represents an application and how the applications interact with Customer 312 in a particular flow or interaction. In this example, Customer 312 may interact with Application 1 ("App 1") which may then interact with Application 2 ("App 2"). FIG. 3 illustrates a downstream flow from App 1 to App 8. This may also be referred to as a Production Product Flow. FIG. 3 illustrates how a transaction will flow from one application to another application. The flow may involve multiple interactions, represented by App 1 to App 8, App A to App D and App E to App F/G. The highlighted applications may indicate a potential issue. In this example, the highlighted applications indicate that there is not enough monitoring information. In another example, the highlighted application may indicate a connectivity issue for a main frame application. The varying degrees of highlighting may also convey urgency, severity and/or other characteristics that may involve additional investigation and action.

Figure 4:
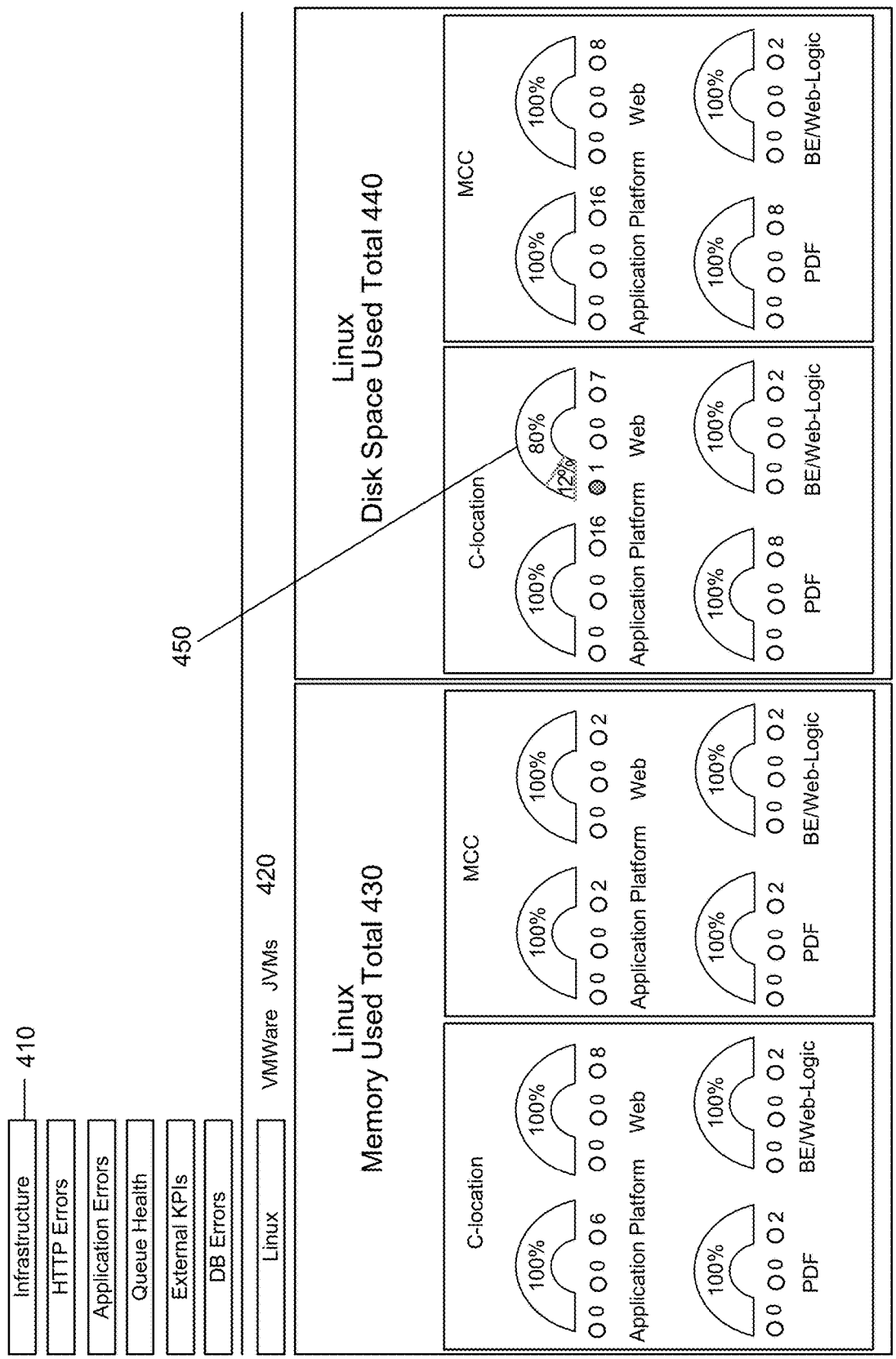
FIG. 4 is an exemplary illustration of a detailed view of an exemplary business flow, according to an embodiment of the present invention.

FIG. 4 is an exemplary illustration of a detailed view of an exemplary business flow, according to an embodiment of the present invention. FIG. 4 provides information relating to various layers of error or issue detection. The layers may include infrastructure, HTTP errors, application errors, queue health, external KPIs, database errors, etc. FIG. 4 illustrates infrastructure details at 410. Details relating to virtual machines (e.g., VMWare, JVMs, etc.) may be shown at 420, specifically Linux Memory Used at 430 and Linux Disk Space Used at 440. Linux disk space details are shown at 450 which indicate to the user that disk space is low. In this example, FIG. 4 provides details relating to data centers and a specific web instance which is behaving abnormally.

An embodiment of the present invention may implement a self-healing feature that addresses the identified issue. This may involve a simple re-startable job, quick fix or other action that executes a runbook in place. Other actions may be applied to address identified issues through an embodiment of the present invention. Another option is to notify a user and further enable the user to address the identified issue and facilitate diagnosis.

Figure 5:
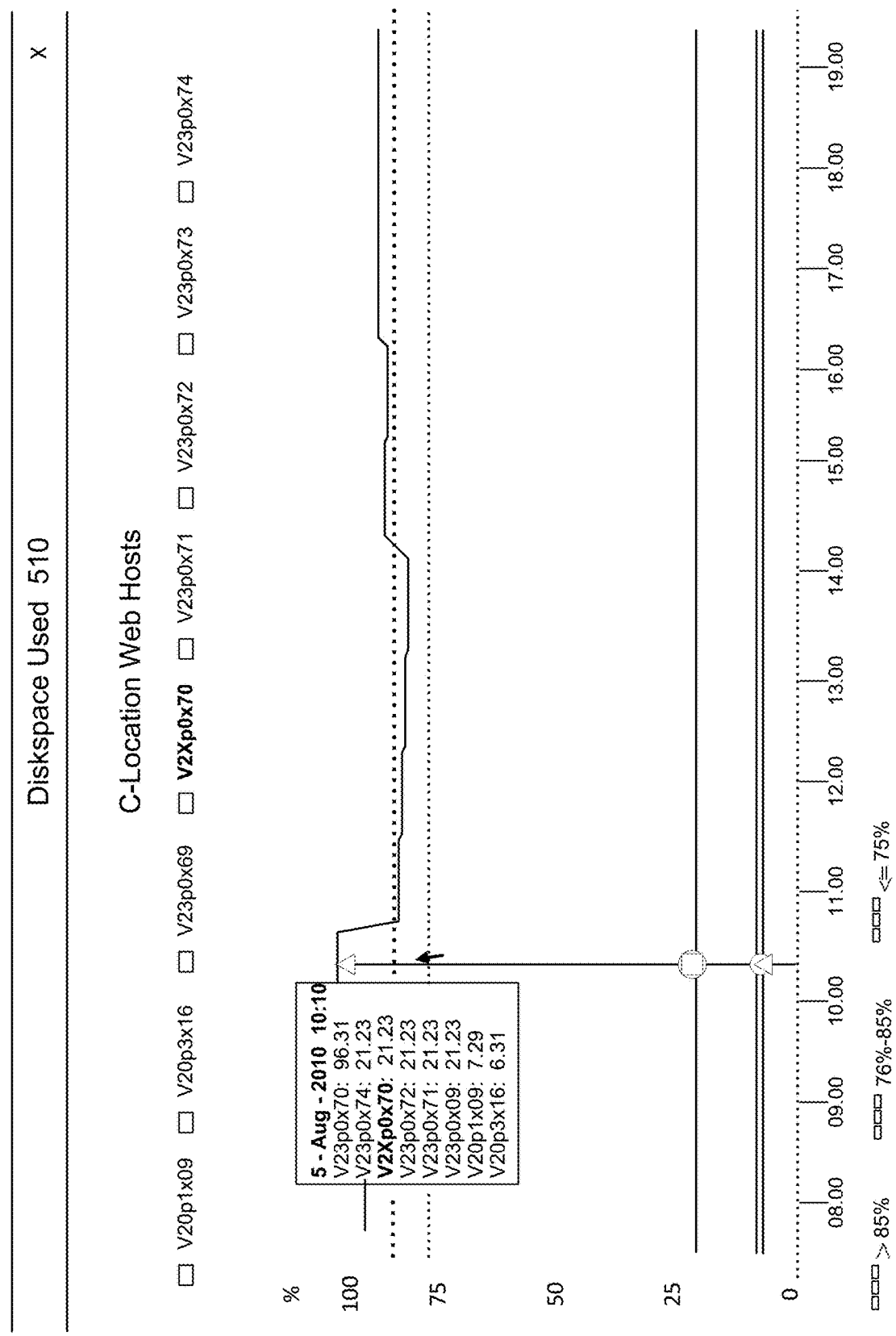
FIG. 5 is an exemplary illustration of a detailed view of an issue relating to an exemplary business flow, according to an embodiment of the present invention.

FIG. 5 is an exemplary illustration of a detailed view of an issue relating to an exemplary business flow, according to an embodiment of the present invention. FIG. 5 provides details concerning the potentially problematic disk space usage at 510. This may correspond to 450 in FIG. 4. FIG. 5 illustrates diskspace data for a set of web hosts.

Figure 6:
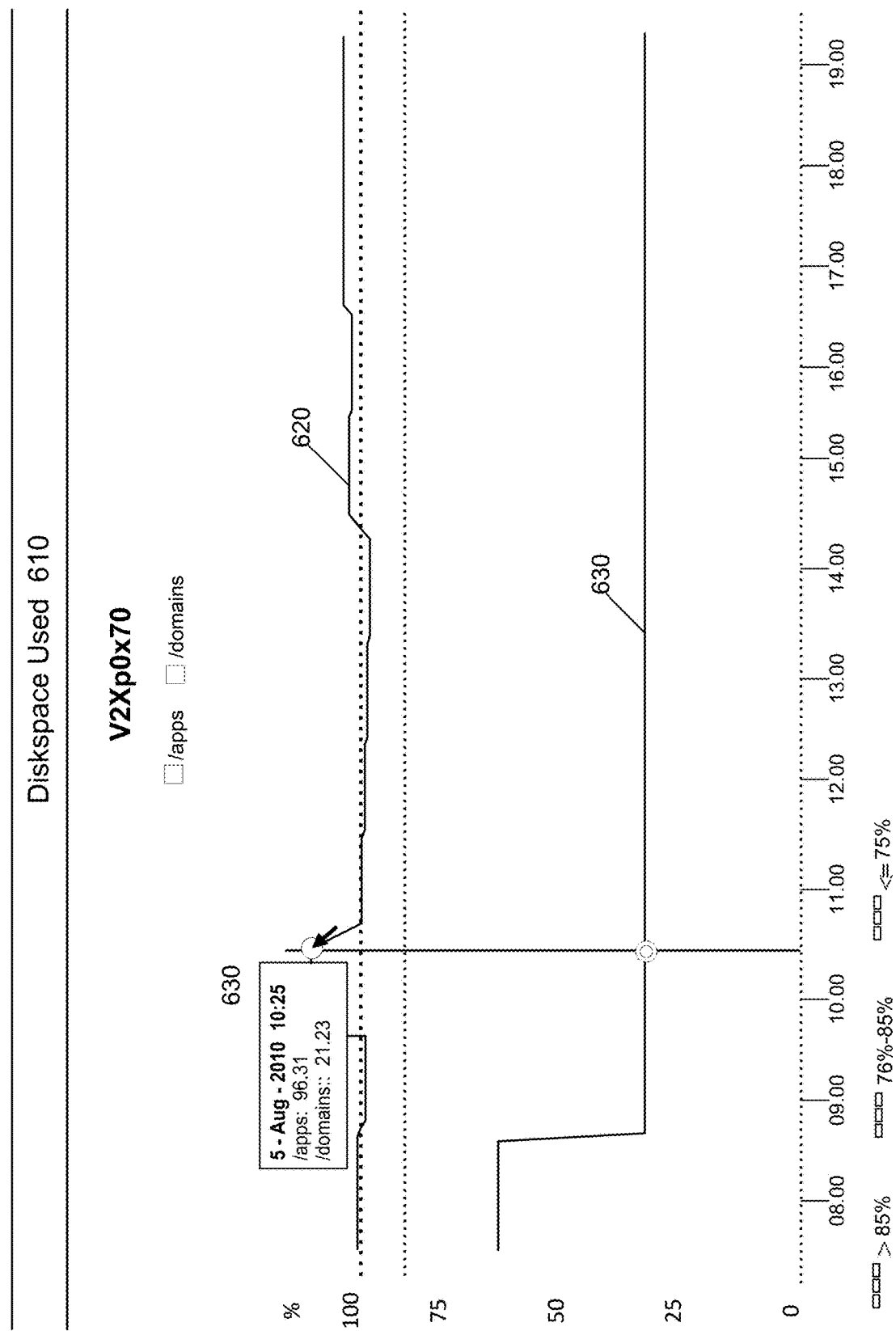
FIG. 6 is an exemplary illustration of a detailed view of an issue relating to an exemplary business flow, according to an embodiment of the present invention.

FIG. 6 is an exemplary illustration of a detailed view of an issue relating to an exemplary business flow, according to an embodiment of the present invention. FIG. 6 provides details concerning the disk space usage at 610 with details specific to applications at 620 and domains at 630, along with details at a specific point in time at 630. The details shown in FIG. 6 may be relevant to a specific asset, e.g., V2Xp0x70.

FIG. 7 is an exemplary illustration of a business flow dashboard, according to an embodiment of the present invention. As shown in FIG. 7, a summary of flows may be provided at 710, 712 and 714. The summary may include Active P1s (as shown by 710), Active Alerts (as shown by 712) and Active Changes (as shown by 714). Active Changes may represent changes in the last 24 hours (or other time period). Flow Details may be provided based on business categories, including Becoming a Customer (at 720), Own a Home (at 722), Protect My Money (at 724), Pay with My Bank (at 726), Update My Account (at 728) and Grow My Wealth (at 730) and others. Flow Details may include flows having one or more P1s or alerts (red); flows having no active P1 s or alerts (green) and flows having one or more active changes (amber). In this example, flows under Becoming a Customer (at 720) have Active P1s and Active Alerts. More specifically, "DDA-Acct-Open-Branch" flow has one or more applications with active P1s. Most flows illustrated in FIG. 7 currently do not have either active P1s or active Alerts. Flows under Own a Home (at 722) and Pay with My Bank (at 726) are shown as having one or more active changes, as noted by the "!" symbol. Other symbols may be used. At 732, Alert Types Report may be identified as well as Information Sources. FIG. 7 is an exemplary illustration for a financial institution related scenario. Other business flows relevant to other industries may be realized.

For example, a user may interact with a flow and then view additional details including impacted applications, connections as well as infrastructure specifics. Impacted applications may be graphically identified to the user (e.g., different colors, graphics, etc.). The graphical representation may be indicative of severity, importance and/or other metric. Applications that need immediate attention may involve major incidents, e.g., P1 incidents. Applications that have active alerts may also be highlighted. Active alerts may indicate to the user that attention may be needed to avoid customer or other impact. In addition, the user may be alert to applications that have experienced change within a predetermined timeframe, e.g., last 24 hours, last 12 hours, daily trend, weekly trend, etc. An embodiment of the present invention recognizes that most incidents are driven by change in issues. With an embodiment of the present invention, a user may pinpoint specific applications, connections and/or other resources that may affect customer experience and impact.

An embodiment of the present invention may provide back-end health checks for applications. Health check data may also be provided through an interactive interface of an embodiment of the present invention. This feature significantly reduces diagnostic time, efforts and resources.

Figure 8:
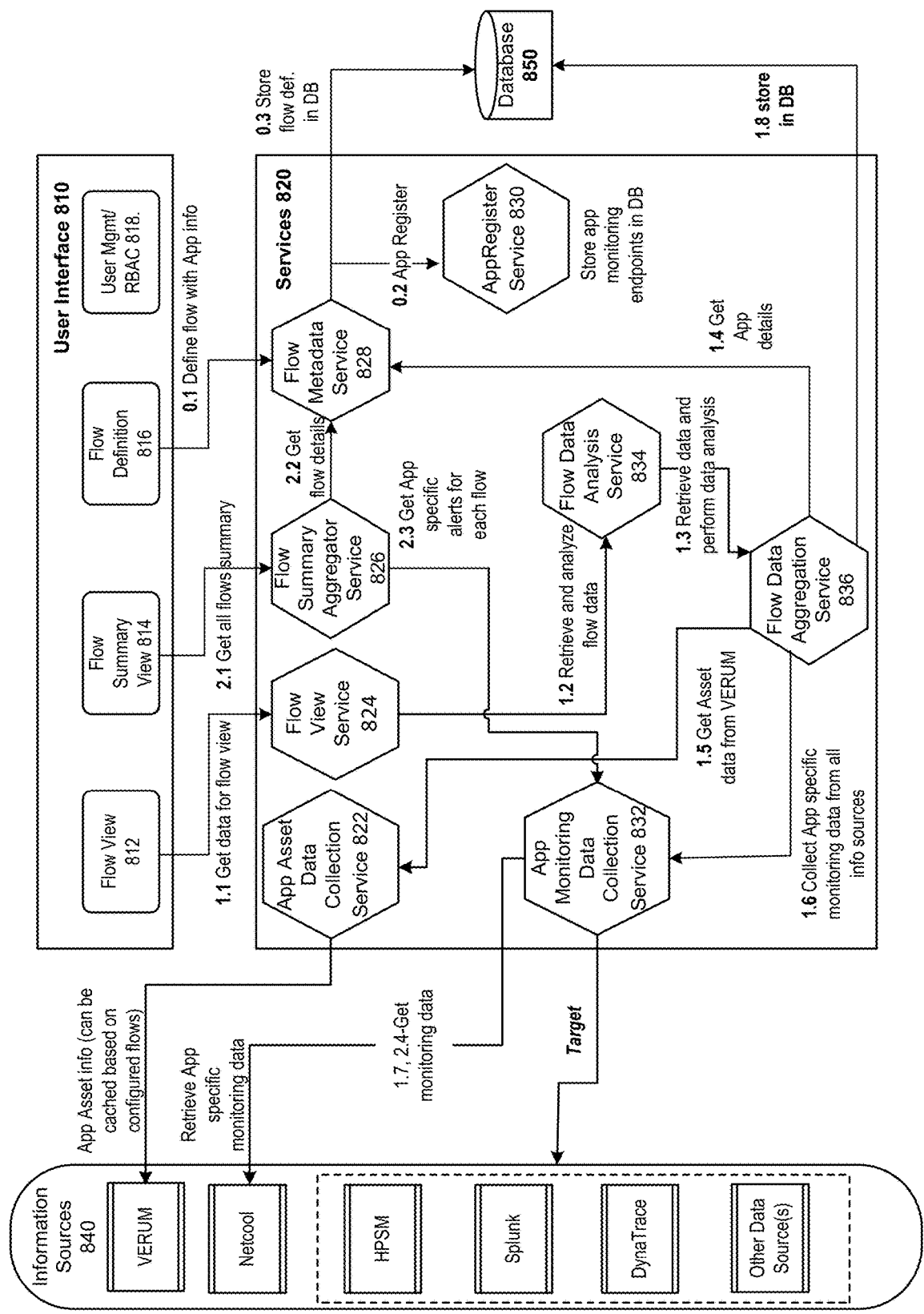
FIG. 8 is an exemplary system diagram, according to an embodiment of the present invention.

FIG. 8 is an exemplary system diagram, according to an embodiment of the present invention. FIG. 8 illustrates a User Interface 810, Services 820 executed by a server or processor, Information Sources 840 and Database 850.

User Interface 810 may include Flow View 812, Flow Summary View 814, Flow Definition 816, User Management/RBAC (Role Based Access Control) 818. Services 820 may include Application Asset Data Collection Service 822, Flow View Service 824, Flow Summary Aggregator Service 826, Flow Metadata Service 828, App Register Service 830, App Monitoring Data Collection Service 832, Flow Data Analysis Service 834 and Flow Data Aggregation Service 836. Services 820 may include various functions that may be executed by one or more computer processors and servers.

Information Sources 840 may include various internal or external sources of data including Verum (software design tool to create, simulate, verify and generate code for embedded and cyber-physical systems), Netcool (service level management system that delivers real-time centralized monitoring of networks and domains), HPSM (HP Service Manager Incident Management Integration system), Splunk (software platform to search, analyze and visualize machine generated data gathered from websites), DynaTrace (software intelligence platform based on AI to monitor and optimize application performance and development), and other data sources for alert and monitoring information.

Flow Definition 816 may define flows with Application information. Flow Metadata Service 828 may store flow definitions in Database 850. Flow Metadata Service 828 may register applications with App Register Service 830. App Register Service 830 may store application monitoring endpoints in Database 850.

Flow View 812 may get data through Flow View Service 824. Flow View Service 824 may retrieve and analyze flow data through Flow Data Analysis Service 834. Flow Data Analysis Service 834 may retrieve data and perform data analytics through Flow Data Aggregation Service 836. App details may be retrieved by Flow Data Aggregation Service 836 through Flow Metadata Service 828. Flow Data Aggregation Service 836 may get asset data from an information source, such as VERUM through App Asset Data Collection Service 822. App Asset information may be retrieved—this information may be cached based on configured flows. Flow Data Aggregation Service 836 may collect app specific monitoring data from various information sources through App Monitoring Data Collection Service 832. Then, App Monitoring Data Collection Service 832 may retrieve app specific monitoring data from one or more information sources, represented by 840 (such as Netcool). Flow Data Aggregation Service 836 may then store data in Database 850.

Flow Summary View 814 may retrieve all flow summary from Flow Summary Aggregator Service 826. Flow details may be retrieved from Flow Metadata Service 828. Flow Summary Aggregator Service 826 may retrieve app specific alerts for each flow from App Monitoring Data Collection Service 832.

An embodiment of the present may dynamically draw flow information from Database 850.

Various other applications and use cases may be supported by the system illustrated in FIG. 8. FIGS. 1-8 are merely exemplary; other variations may be supported by various applications, use cases, system architecture, businesses, etc.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for precise identification of technical issues in a job production of product flows for software applications, the system comprising:
   a database that stores flow definition data and flow data aggregation;
   a flow interactive interface that receives user input via a communication network; and
   a computer processor, coupled to the database and the flow interactive interface, programmed to perform:
      identifying information sources comprising:
         a software design tool that creates, simulates, verifies and generates computer code for embedded and cyber-physical systems;
         a service level management system that delivers real-time centralized monitoring of networks and domains,
         a service manager system for incident management integration,
         a software platform to search, analyze and visualize machine generated data gathered from websites, and
         an artificial intelligence software intelligence platform that monitors and optimizes performance and development of the software applications;
      retrieving, via a flow view interface, a flow view request data relating to the product flows for the software applications of at least one asset, the product flows including interactions between the software applications and at least one customer;
      responsive to the flow view request data, performing flow data analysis and the flow data aggregation;
      retrieving, by a flow metadata service, application data relating to the software applications;
      retrieving, by an application asset data collection service, asset data relating to the at least one asset from one or more of the information sources;
      collecting application specific monitoring data from one or more of the information sources;
      based on the application data, the asset data, and the application specific monitoring data, detecting, for each of the software applications, the technical issues comprising: memory usage having reached a threshold, insufficient information collected from the monitored application specific data, and connectivity issues that exist at various layers of connection between the software applications;
      mitigating the insufficient information, by providing, through the flow view interface, back-end health checks that further monitor the application specific data in real time to reduce diagnostic time, efforts and computing resources, and to enable faster detection and diagnosis of incidents for improved stability and consistency with respect to the product flows;
      diagnosing the detected connectivity issues as caused by one or more of: http errors, application errors and database errors;
      visually displaying, on the flow interactive interface, the product flows including the software applications, the interactions between the software applications, and the client interaction with the software applications, the software applications being color coded by incident severity based on the detecting;
      further visually displaying, on the flow interactive interface, those applications among the software applications which have experienced a change in the technical issues within a predetermined timeframe;
      providing, through the flow interactive interface, detailed incident information upon user selection of one of the color coded incidents; and
      implementing a computerized self-healing feature to fix the detected technical issues by executing a software runbook and re-starting the job production of the product flows for the software applications.

2. The system of claim 1, wherein the computer processor is further programmed to perform:
generating a set of categories where each category comprises a set of flows wherein each category has an associated indication of performance.

3. The system of claim 1, wherein the computer processor is further programmed to perform:
storing, at the database, the collected application specific monitoring data.

4. The system of claim 1, wherein the computer processor is further programmed to perform:
generating and providing a flow summary view from a flow summary aggregation service.

5. The system of claim 4, wherein the flow summary aggregation service retrieves flow details from the flow metadata service.

6. The system of claim 1, wherein the flow interactive interface further comprises flow metrics, self-healing metrics, prediction data, and health diagnostic data.

7. The system of claim 1, wherein the computer processor is further programmed to perform:
generating predictive metrics based on historical data.

8. The system of claim 1, wherein the applications relate to multiple lines of business.

9. A computer implemented method for precise identification of technical issues in a job production of product flows for software applications, the method comprising:
executing, by a computer processor, a database that stores flow definition data and flow data aggregation;
executing, by the computer processor, a flow interactive interface that receives user input via a communication network;
identifying, by the computer processor, information sources comprising:
a software design tool that creates, simulates, verifies and generates computer code for embedded and cyber-physical systems;
a service level management system that delivers real-time centralized monitoring of networks and domains,
a service manager system for incident management integration,
a software platform to search, analyze and visualize machine generated data gathered from websites, and
an artificial intelligence software intelligence platform that monitors and optimizes performance and development of the software applications;
retrieving, by the computer processor via a flow view interface, a flow view request data relating to the product flows for the software applications of at least one asset, the product flows including interactions between the software applications and at least one customer;
responsive to the flow view request data, performing, by the computer processor, flow data analysis and the flow data aggregation;
retrieving, by a flow metadata service, application data relating to the software applications;
retrieving, by an application asset data collection service, asset data relating to the at least one asset from one or more of the information sources;
collecting, by the computer processor, application specific monitoring data from one or more of the information sources;
based on the application data, the asset data, and the application specific monitoring data, detecting, by the computer processor, for each of the software applications, the technical issues comprising: memory usage having reached a threshold, insufficient information collected from the monitored application specific data, and connectivity issues that exist at various layers of connection between the software applications;
mitigating, by the computer processor, the insufficient information, by providing, through the flow view interface, back-end health checks that further monitor the application specific data in real time to reduce diagnostic time, efforts and computing resources, and to enable faster detection and diagnosis of incidents for improved stability and consistency with respect to the product flows;
diagnosing, by the computer processor, the detected connectivity issues as caused by one or more of: http errors, application errors and database errors;
visually displaying, on the flow interactive interface, the product flows including the software applications, the interactions between the software applications, and the client interaction with the software applications, the software applications being color coded by incident severity based on the detecting;
further visually displaying, on the flow interactive interface, those applications among the software applications which have experienced a change in the technical issues within a predetermined timeframe;
providing, through the flow interactive interface, detailed incident information upon user selection of one of the color coded incidents; and
implementing a computerized self-healing feature to fix the detected technical issues by executing a software runbook and re-starting the job production of the product flows for the software applications.

10. The method of claim 9, further comprising:
generating, by the computer processor, a set of categories where each category comprises a set of flows wherein each category has an associated indication of performance.

11. The method of claim 9, further comprising:
storing, by the computer processor at the database, the collected application specific monitoring data.

12. The method of claim 9, further comprising:
generating and providing, by the computer processor, a flow summary view from a flow summary aggregation service.

13. The method of claim 12, wherein the flow summary aggregation service retrieves flow details from the flow metadata service.

14. The method of claim 9, further comprising:
displaying, by the flow interactive interface: flow metrics, self-healing metrics, prediction data, and health diagnostic data.

15. The method of claim 9, further comprising:
generating, by the computer processor, predictive metrics based on historical data.

16. The method of claim 9, wherein the applications relate to multiple lines of business.

* * * * *